(12) United States Patent
Akaboshi et al.

(10) Patent No.: US 6,990,487 B2
(45) Date of Patent: Jan. 24, 2006

(54) SEARCHING APPARATUS AND SEARCHING METHOD USING PATTERN OF WHICH SEQUENCE IS CONSIDERED

(75) Inventors: Naoki Akaboshi, Kawasaki (JP); Lilian Harada, Kawasaki (JP); Kazumi Kubota, Kawasaki (JP); Riichiro Take, Kawasaki (JP); Satoshi Ikuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 392 days.

(21) Appl. No.: 10/092,444

(22) Filed: Mar. 8, 2002

(65) Prior Publication Data
US 2003/0093416 A1 May 15, 2003

(30) Foreign Application Priority Data
Nov. 6, 2001 (JP) .................................. 2001-340817

(51) Int. Cl.
*G06F 17/30* (2006.01)

(52) U.S. Cl. .................... 707/6; 707/3; 707/5; 707/100

(58) Field of Classification Search ............... 707/3, 707/6, 100, 5; 706/48
See application file for complete search history.

(56) References Cited

U.S. PATENT DOCUMENTS

| 5,204,958 | A | * | 4/1993 | Cheng et al. ............... 707/102 |
| 5,440,730 | A | * | 8/1995 | Elmasri et al. ............. 707/203 |
| 5,628,008 | A | * | 5/1997 | Hayashi ..................... 715/513 |
| 6,078,923 | A | * | 6/2000 | Burrows ..................... 707/101 |
| 6,268,849 | B1 | * | 7/2001 | Boyer et al. ................. 725/40 |
| 6,601,061 | B1 | * | 7/2003 | Holt et al. ..................... 707/3 |
| 6,742,003 | B2 | * | 5/2004 | Heckerman et al. ...... 707/104.1 |

* cited by examiner

*Primary Examiner*—Shahid Alam
*Assistant Examiner*—Cam Truong
(74) *Attorney, Agent, or Firm*—Staas & Halsey LLP

(57) ABSTRACT

A state of which a particular attribute of a record has a particular value is defined as an event. With a plurality of events and the relation of a sequence thereof, a search pattern is designated. A set of records as a search target are searched for a combination of records corresponding to the search pattern.

19 Claims, 34 Drawing Sheets addeabclsfsallfefefeafazzaabababasasfasfalallaall

F I G. 1 A

| SYNTAX | DESCRIPTION |
|--------|-------------|
|        | ANY CHARACTER STRING |
| X*     | X REPEATEDLY OCCURS 0 OR MORE TIMES |
| X\|Y   | X OR Y OCCURS |
| X+     | ARRAY OF AT LEAST ONE X |
| X?     | 0 OR ONE X |

FIG. 1D

| CUSTOMER ID | DATE | COMMODITY | PRICE |
|---|---|---|---|
| 10001 | 03/21 | MILK | 189 |
| 10001 | 03/21 | BREAD | 300 |
| 10002 | 03/23 | RICE | 3900 |
| 10003 | 03/23 | CHEESE | 600 |

FIG. 1E

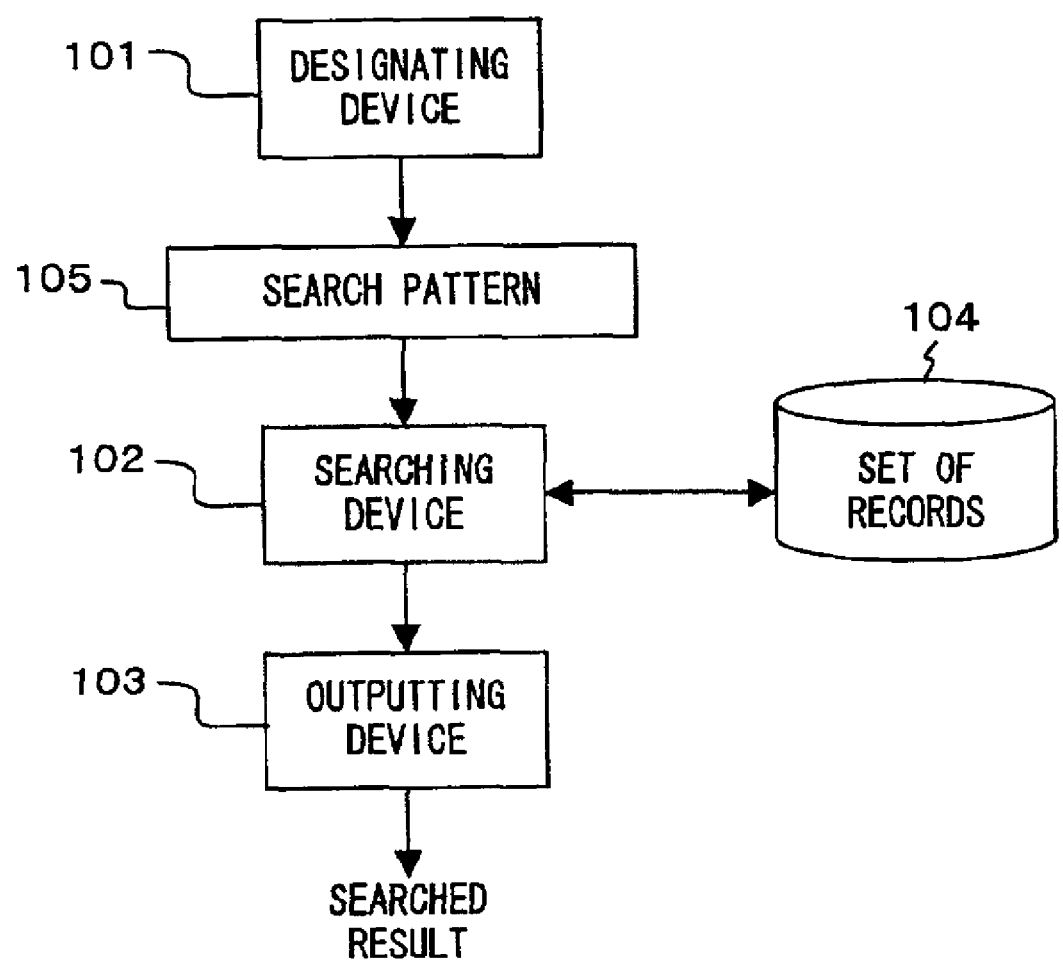
F I G. 2

A: PC AND ¥250,000

F I G. 3A

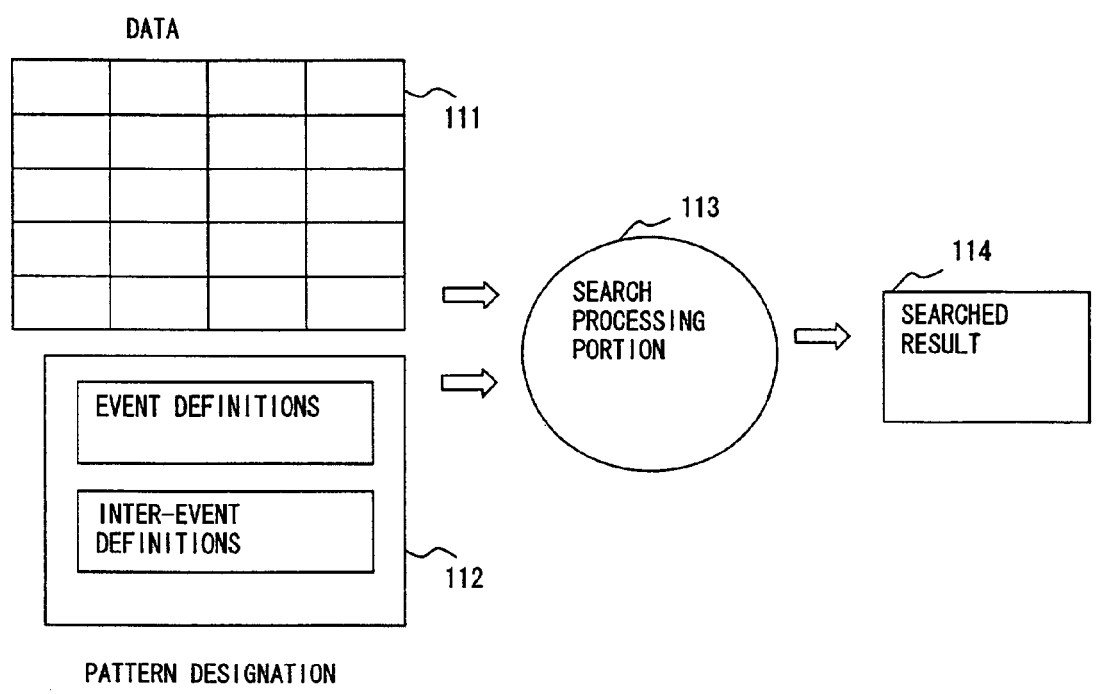
F I G. 4

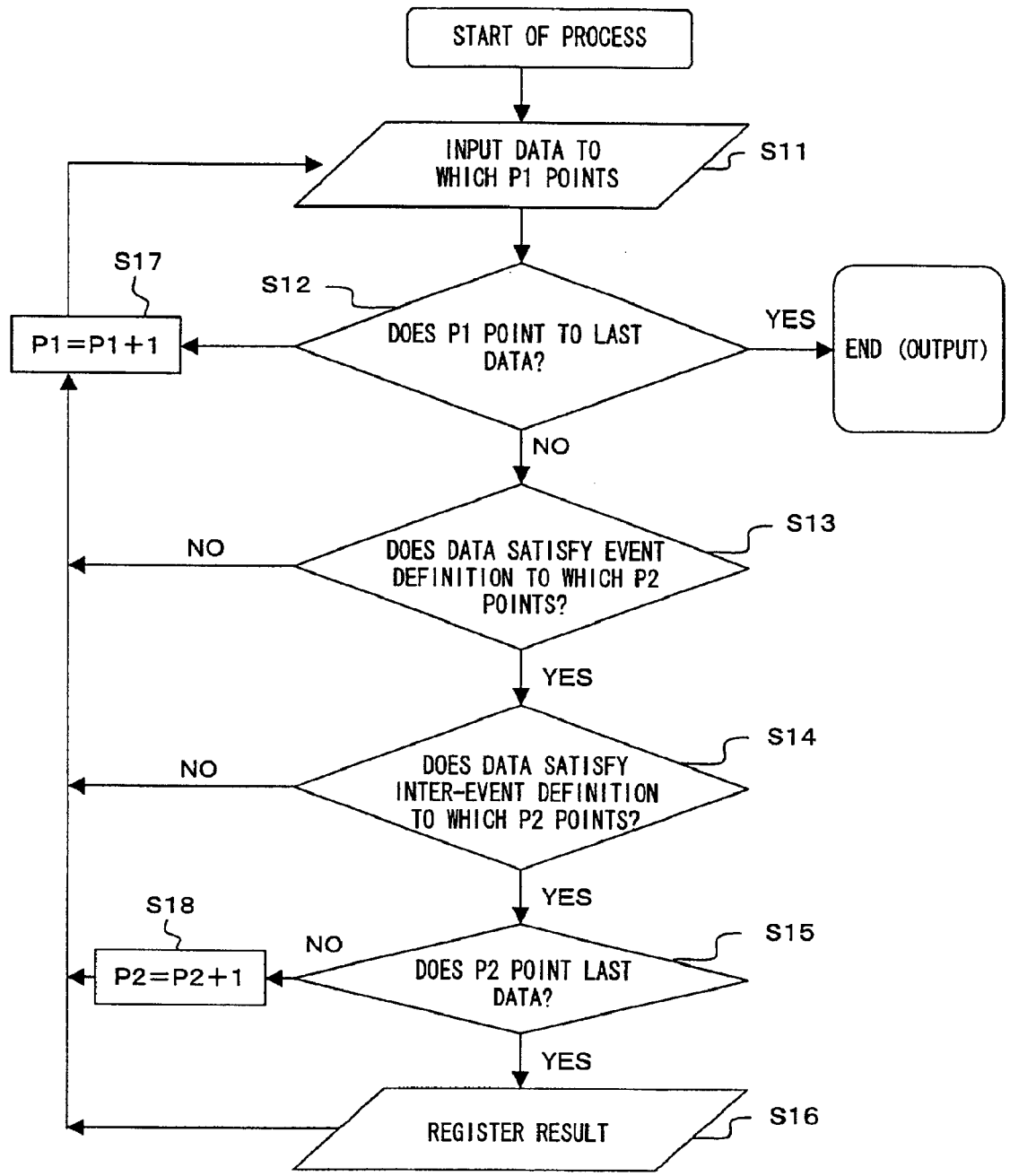
F I G. 7

| CUSTOMER ID | DATE | COMMODITY |
|---|---|---|
| 10001 | 03/21 | MILK |
| 10001 | 03/21 | BREAD |
| 10002 | 03/23 | RICE |
| 10003 | 03/23 | CHEESE |

FIG. 8

| COMMODITY | PRICE |
|---|---|
| BREAD | 300 |
| MILK | 189 |
| RICE | 3900 |
| CHEESE | 600 |

FIG. 9

```
SELECT  A. CID,  A. DATE,  A. COMMODITY,  B. PRICE
FROM A, B
WHERE A. COMMODITY = B. COMMODITY
```

FIG. 10

| CUSTOMER ID | DATE | COMMODITY | PRICE |
|---|---|---|---|
| 00 | 03/21 | MILK | 189 |
| 00 | 03/21 | BREAD | 300 |
| 01 | 03/23 | RICE | 3900 |
| 10 | 03/23 | CHEESE | 600 |

FIG. 11

| RECORD NUMBER | DATE | COMMODITY | PRICE |
|---|---|---|---|
| 1 | 03/21 | MILK | 189 |
| 2 | 03/21 | BREAD | 300 |
| 3 | 03/22 | MILK | 189 |
| 4 | 03/22 | BREAD | 300 |
| 5 | 03/23 | RICE | 3900 |
| 6 | 03/23 | MILK | 189 |
| 7 | 03/23 | BREAD | 600 |

FIG. 13

| CUSTOMER ID | DATE OF PURCHASE | COMMODITY | PRICE |
|---|---|---|---|
| 110001001 | 2001/01/13 | A | 838 |
| 110001321 | 2001/01/14 | K | 1300 |
| 110001001 | 2001/01/13 | N | 1800 |
| 110011047 | 2001/01/20 | S | 581 |
| 110001321 | 2001/01/27 | J | 700 |
| 110001001 | 2001/01/28 | B | 838 |
| 110001213 | 2001/01/28 | G | 1600 |
| 110001382 | 2001/01/30 | Y | 2600 |
| 110011047 | 2001/01/31 | I | 1300 |
| 110001478 | 2001/02/01 | M | 1400 |
| 110002438 | 2001/02/01 | A | 838 |
| 110011047 | 2000/02/03 | T | 1300 |

FIG. 15

| CUSTOMER ID | DATE OF PURCHASE | COMMODITY | PRICE |
|---|---|---|---|
| 110001001 | 2001/01/13 | A | 838 |
| 110001001 | 2001/01/13 | N | 1800 |
| 110001001 | 2001/01/28 | B | 838 |
| 110001213 | 2001/01/28 | G | 1600 |
| 110001321 | 2001/01/14 | K | 1300 |
| 110001321 | 2001/01/27 | J | 700 |
| 110001382 | 2001/01/30 | Y | 2600 |
| 110001478 | 2001/02/01 | M | 1400 |
| 110002438 | 2001/02/01 | A | 838 |
| 110011047 | 2000/02/03 | T | 1300 |
| 110011047 | 2001/01/20 | S | 581 |
| 110011047 | 2001/01/31 | I | 1300 |

FIG. 16

| CUSTOMER ID | DATE OF PURCHASE | COMMODITY | PRICE |
|---|---|---|---|
| 110001001 | 2001/01/13 | A | 838 |
| 110001001 | 2001/01/13 | N | 1800 |
| 110001001 | 2001/01/28 | B | 838 |
| 110001213 | 2001/01/28 | G | 1600 |
| 110001321 | 2001/01/14 | K | 1300 |
| 110001321 | 2001/01/27 | J | 700 |
| 110001382 | 2001/01/30 | Y | 2600 |
| 110001478 | 2001/02/01 | M | 1400 |
| 110002438 | 2001/02/01 | A | 838 |
| 110011047 | 2000/02/03 | T | 1300 |
| 110011047 | 2001/01/20 | S | 581 |
| 110011047 | 2001/01/31 | I | 1300 |

Event 1 → (row 1)
Event 2 → (row 3)

F I G. 1 8

| DATE | COMMODITY | DATE |
|---|---|---|
| 3/21 | MILK | FINE |
| 3/21 | BREAD | FINE |
| 3/21 | RICE | RAINY |
| 3/23 | BREAD | RAINY |
| 3/23 | CHEESE | RAINY |

FIG. 19

| RID | CUSTOMER ID | DATE OF PURCHASE | COMMODITY | PRICE |
|---|---|---|---|---|
| R1 | 110001001 | 2001/01/13 | A | 838 |
| R2 | 110001001 | 2001/01/13 | N | 1800 |
| R3 | 110001001 | 2001/01/28 | B | 838 |
| R4 | 110001001 | 2001/01/28 | J | 700 |
| R5 | 110001001 | 2001/01/29 | T | 1300 |
| R6 | 110001001 | 2001/01/31 | S | 581 |
| R7 | 110001001 | 2001/02/15 | K | 1600 |

FIG. 22

| EVENT NAME | EVENT DEFINITION | INTER-EVENT DEFINITION |
|---|---|---|
| EVENT 1: | COMMODITY = A | |
| EVENT 2: ↑P2 | PRICE <= 838 | WITHIN 3 DAYS AFTER EVENT 1 |

FIG. 23

| EVENT NAME | EVENT DEFINITION | INTER-EVENT DEFINITION |
|---|---|---|
| EVENT 1: | COMMODITY = A | |
| EVENT 2: | PRICE <= 838 | WITHIN 3 DAYS AFTER EVENT 1 |

R1 ↑ P2

F I G. 2 4

| RID | CUSTOMER ID | DATE OF PURCHASE | SEQUENCE NUMBER | COMMODITY | PRICE |
|---|---|---|---|---|---|
| R1 | 110001001 | 2001/01/13 | 1 | A | 838 |
| R2 | 110001001 | 2001/01/13 | 1 | N | 1800 |
| R3 | 110001001 | 2001/01/28 | 2 | B | 838 |
| R4 | 110001001 | 2001/01/28 | 2 | J | 700 |
| R5 | 110001001 | 2001/01/29 | 3 | T | 1300 |
| R6 | 110001001 | 2001/01/31 | 4 | S | 581 |
| R7 | 110001001 | 2001/02/15 | 5 | K | 1600 |

F I G. 2 5

| EVENT NAME | EVENT DEFINITION | INTER-EVENT DEFINITION |
|---|---|---|
| EVENT 1: | COMMODITY = A | |
| EVENT 2: | PRICE <= 838 | WITHIN 3 TIMES COMING TO THE STORE AFTER EVENT 1 |

| EVENT NAME | EVENT DEFINITION | INTER-EVENT DEFINITION |
|---|---|---|
| EVENT 1: | COMMODITY = A | |
| EVENT 2: | ANY | WITHIN 3 TIMES OF COMING TO THE STORE AFTER EVENT 1<br><br>PRICE OF EVENT 1 OR LOWER |

← P2

SEARCHING APPARATUS AND SEARCHING METHOD USING PATTERN OF WHICH SEQUENCE IS CONSIDERED

BACKGROUND OF THE INVENTION

1. Field of the Invention

The present invention relates to a searching apparatus and a searching method for searching a large number of data for a pattern based on a sequence of each data thereof.

2. Description of the Related Art

As conventional technologies for handing data based on a sequence thereof, a relational database and pattern matching are known. The pattern matching uses a regular expression of an occurrence sequence of character strings. For time sequence data such as stock price data, a dedicated application has been used. Next, the features and art areas of the conventional technologies will be described.

(1) Relational Database

Relational databases have been widely used for storing a large number of data. As described in a paper by E. F. Codd (1970) who created a relational database, a set of data of the relational database do not have a concept of a sequence. However, the relational database provides data types such as date type and time type. In addition, the relational database provides a sorting function for sorting records corresponding to values. Thus, the relational database can be used for storing data that have a sequence.

Although the database can handle a date as a data type, the database does not have a concept of a sequence. Thus, a query for searching for a pattern of data of which a sequence such as a time sequence is considered cannot be processed by only SQL (Structured Query Language). To solve such a problem, the process should be performed in a combination of the database and an external program. Thus, whenever a pattern of which a sequence is considered is extracted, the program should be used.

(2) Pattern Matching in Regular Expression

In the art area of a character string searching, considering the sequence of which character strings occur, a pattern matching in a regular expression has been used. First of all, it is necessary to clarify the difference between the character string searching and the pattern matching. The character string searching is an operation of which a pattern as a search target has been fully determined (for example, "search the text for a pattern abc"). On the other hand, the pattern matching is an operation of which data is searched for an undetermined pattern. The pattern matching is also referred to as pattern collating. In the pattern matching, a regular expression is used to designate a pattern.

FIG. 1A shows an example of character string data and a pattern matching of a regular expression a (a|b)*a. In the example, (a|b)* represents that a or b repeatedly occurs at least 0 time. It is likely that the character string searching and the pattern matching are identical. However, since they are classified as different categories, different algorisms should be applied thereto.

To accomplish a pattern matching in a regular expression, a finite automaton is used. To convert a regular expression into an automaton, a two-staged approach is performed. As a first stage, a regular expression is converted into a non-deterministic finite automaton (NFA). It is easy to convert a regular expression into an NFA. A pattern matching can be performed only with an NFA. Alternatively, an obtained NFA is converted into a deterministic finite automaton (DFA) that is equivalent thereto. Thereafter, with the DFA, a pattern matching is performed. The latter method is often used.

As the "deterministic" of the DFA implies, when an input is determined in some state, one destination is determined. On the other hand, as the "non-deterministic" of the NFA implies, there is a possibility of which there are a plurality of transition destinations against one input in some state.

FIG. 1B shows an NFA corresponding to a regular expression a (a|b)*a. Now, consider the case that a character string aaa is given to the NFA. When the first character a is input, the initial state 0 is transited to state 1. The second character is also a. The state 1 has two states 1 and 2 as transition destinations for the character a. Stating the conclusion first, for the second character a, the state 1 is transited to the state 1. For the third character a, the state 1 is transited to state 2. However, at the time of which the second character a is read, it is uncertain to which state the current state is transited.

To solve this problem, using a backtrack, one of the two states is temporarily selected. The state is transited to the selected state. In the selected state, the process is performed. When the process fails, the process is transited to the other state. However, when a backtrack is used, a time for the returning process is required.

Thus, rather than using the NFA converted from the regular expression, the NFA is further converted into a DFA. With the obtained DFA, a pattern matching process is performed. In the case that a DFA is used instead of an NFA, when a state and an input are determined, only one transition destination is determined. Thus, since a backtrack is not necessary unlike with an NFA, the process can be executed at high speed.

For example, an NFA shown in FIG. 1B is converted into a DFA as shown in FIG. 1C. Of course, it takes a time to convert an NFA into a DFA. However, when a pattern matching is performed for a large number of data, since the DFA that does not have a backtrack operates at high speed, the process can be performed at sufficiently high speed.

The regular expression is recursively defined by three basic operations (operators) of concatenation, union, and closure as shown in FIG. 1D. As with normal mathematical expressions, those basic operations have a priority. A closure "*" is most strongly connected. A concatenation is second most strongly connected. A union "|" is least strongly connected. However, when a character or a symbol is parenthesized, the priority thereof can be changed.

POSIX (Portable Operating System Interface for UNIX (Registered Trademark)) 1003.2 prescribes two types of regular expressions that are Basic Regular Expression (BRE) and Extended Regular Expression (ERE). Software utilities that run on UNIX (Registered Trademark) that uses the BRE are ed, ex, vi, more, sed, grep, and so forth. On the other hand, software utilities that run on UNIX (Registered Trademark) that uses the ERE are awk and grep with –E option designated.

(3) Time Sequence Application

There is a case of which sequential data is processed using a dedicated application as with a sequential pattern of a stock market forecast or a data mining. When a dedicated application is used, a time sequential pattern can be processed at high speed. However, such a dedicated application cannot be always used for various conventional queries.

However, the above-described conventional searching process has the following problems.

An regular expression of a character string and a pattern matching therewith are a general framework that provides a searching method for a character string in any class. However, as described in (1) to (3) that follow, since data of which a sequence is considered is different from character string data in their characteristics, a regular expression and a pattern matching thereof cannot be applied to the data of which the sequence is considered.

(1) A character string consists of only characters that are adjacently arranged at equal intervals. On the other hand, data of which a sequence is considered may have a plurality of events at some position. For example, there is a case that a customer makes a plurality of shopping on the same day. Thus, an expression "a customer 10001 bought two commodities of milk and bread on March 21" is required. However, with respect to a character string, two characters do not occur at the same position. Thus, a regular expression cannot represent events that occur at the same time.

(2) With respect to a character string, a value is identical to a literal. In other words, when a character string "A" is given, it is both a value of "A" and an A as a literal. However, with respect to data composed of a plurality of attributes, it is necessary to treat a combination of conditions of a plurality of fields (in this case, commodities and prices) (for example, customers who bought bread that is ¥200 or higher are called 'customer group A') as an literal. A combination of conditions of a plurality of fields cannot be represented in a regular expression.

(3) In the case of data of which a sequence is considered, the sequence requires a concept of an interval (for example, "cheese was bought within two days after bread was bought". However, in a regular expression of a character string, an interval cannot be designated.

FIG. 1E shows retail sales data as an example of data of which a sequence is considered. In the example, dates on which customers bought commodities are a sequence. Referring to FIG. 1E, a customer 100001 bought milk and bread at the same time on March 21 (03/21). However, events that occur at the same time cannot be represented in a regular expression. In addition, with respect to retail sales data, there is no data on March 22 that is a holiday. However, with respect to a character string, there is no situation of which no character occurs at a particular position. In addition, it is difficult to represent a regular expression considering the relation of a sequence (for example, the interval between the date on which a particular customer bought a particular commodity at a particular store and the date on which he or she came to the store is within three days).

As was described above, it is impossible for the conventional regular expression and automaton theory to generally to designate a pattern of which a sequence is considered from a set of records of which a sequence is considered.

In addition, as was described above, a relational database supports the relation of a sequence in a limited form. Thus, when data of which a sequence is considered is searched for a designated pattern, a process should be performed in a combination of a database and an external program. However, when a program is created for each query, a pattern matching cannot be executed only by changing a pattern to be designated unlike with a pattern matching in a regular expression.

In addition, as with a stock price forecast, to analyze data of which a sequence is considered, there is a method for using a dedicated application. When data prepared for some purpose is input to a dedicated application, it returns a predetermined result. Thus, only for the purpose, the process can be performed at high speed. However, since a dedicated application is designed for a dedicated purpose, the dedicated application cannot handle a variety of problems such as a pattern matching in a regular expression.

SUMMARY OF THE INVENTION

An object of the present invention is to provide a searching apparatus and a searching method for searching data of which a sequence is considered for a pattern using a general-purpose expression that represents the relation of the sequence among data.

The searching apparatus according to the present invention comprises a designating device, a searching device, and an outputting device. The searching apparatus searches a set of records for a combination of records, each of the record is composed of a plurality of attributes.

The designating device designates a search pattern using a plurality of events and the relation of a sequence of the plurality of events, each of the events defining a particular value of a particular attribute, the relation of the sequence of the events being defined corresponding to the sequence of attribute values. The searching device searches the set of records for a combination of records corresponding to the designated search pattern. The outputting device outputs a searched result.

BRIEF DESCRIPTION OF DRAWINGS

FIG. 1A is a schematic diagram showing a pattern matching in a regular expression;

FIG. 1D is a schematic diagram showing operators in a regular expression;

FIG. 1E is a schematic diagram showing retail sales data;

FIG. 2 is a schematic diagram showing the theory of a searching apparatus according to the present invention;

FIG. 3A is a schematic diagram showing an event definition;

FIG. 4 is a schematic diagram showing the structure of the searching apparatus;

FIG. 7 is a flow chart showing a searching process;

FIG. 8 is a schematic diagram showing a first table;

FIG. 9 is a schematic diagram showing a second table;

FIG. 10 is a schematic diagram showing an SQL statement;

FIG. 11 is a schematic diagram showing compressed data;

FIG. 13 is a schematic diagram showing first search target data;

FIG. 15 is a schematic diagram showing second search target data;

FIG. 16 is a schematic diagram showing data that has been sorted;

FIG. 18 is a schematic diagram showing data records corresponding to an event pattern;

FIG. 19 is a schematic diagram showing data that has been sorted;

FIG. 22 is a schematic diagram showing third search target data;

FIG. 23 is a schematic diagram showing a first query pattern;

FIG. 24 is a schematic diagram showing a movement of a pointer;

FIG. 25 is a schematic diagram showing an internal format of search target data;

FIG. 26 is a schematic diagram showing a second query pattern;

FIG. 27 is a schematic diagram showing a third query pattern;

DESCRIPTION OF PREFERRED EMBODIMENT

Figure 1B:
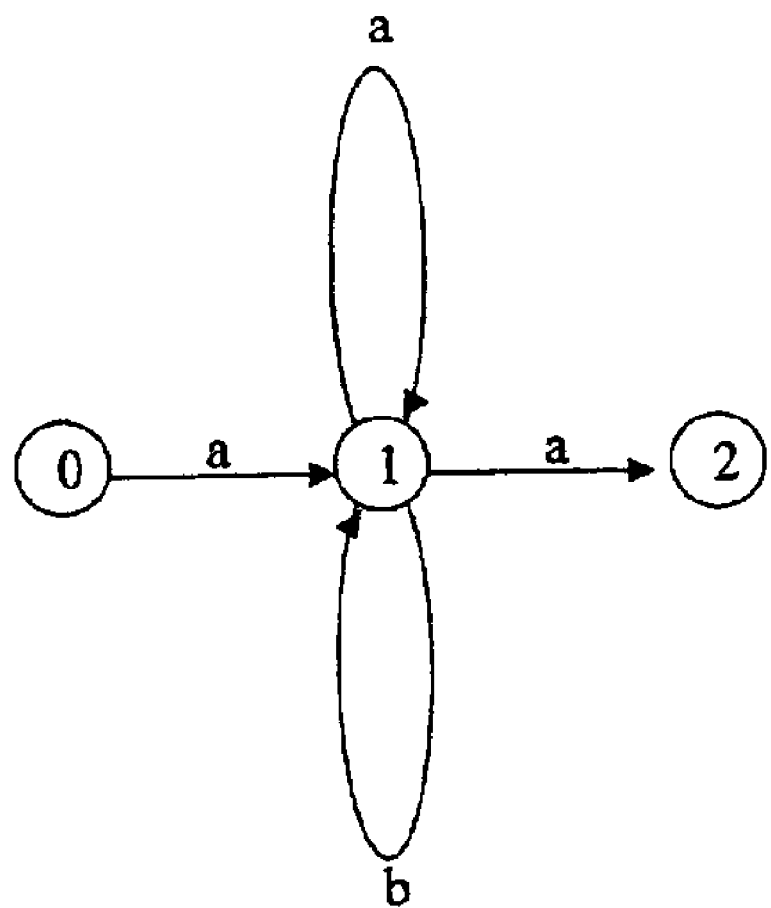
FIG. 1B is a schematic diagram showing an NFA.
Figure 1C:
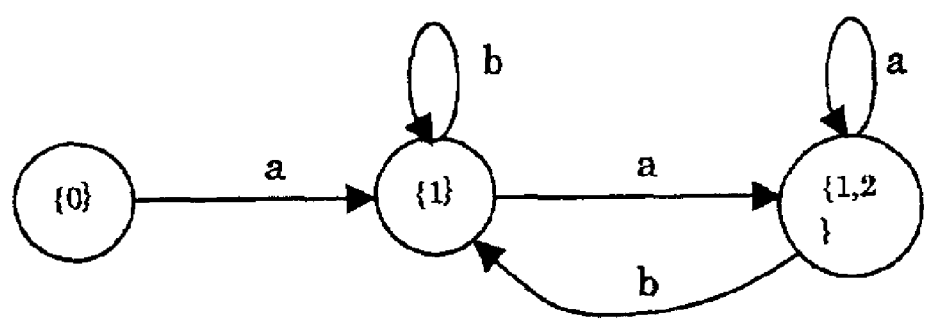
FIG. 1C is a schematic diagram showing a DFA.

Next, with reference to the accompanying drawings, an embodiment of the present invention will be described in detail.

FIG. 2 is a schematic diagram showing the theory of a searching apparatus according to the present invention. The searching apparatus shown in FIG. 2 comprises a designating device 101, a searching device 102, and an outputting device 103. The searching apparatus searches a set 104 of records each of which is composed of a plurality of attributes for a combination of data records.

The designating device 101 designates a search pattern (event pattern) 105 using a plurality of events and the relation of a sequence of the events. Each of the events defines a particular value of a particular attribute of a particular record. The searching device 102 searches the set 104 of records for a combination of records corresponding to the designated search pattern 105. The outputting device 103 outputs a searched result.

An event is defined as a state of which a particular attribute of a particular record has a particular value. The relation of a sequence of a plurality of events is defined corresponding to the relation of a sequence of at least one attribute value of records corresponding to the events. With the designating device 101, the user designates the search pattern 105 that is defined by the events and the relation of a sequence thereof. The designating device 101 outputs the search pattern 105 to the searching device 102. The searching device 102 interprets the received search pattern 105 and extracts a combination of records corresponding to the search pattern 105. The outputting device 103 outputs information such as the extracted records as a searched result.

According to such a searching apparatus, a variety of search patterns including the case that two or more events occur at the same time in the sequence and the case that the relation of a sequence of a plurality of events are represented at any intervals can be easily designated. As a result, a general purpose data search of which a sequence is considered can be accomplished.

The designating device 101 shown in FIG. 2 corresponds to an inputting device 153 shown in FIG. 28 that will be described later. The searching device 102 and the outputting device 103 shown in FIG. 2 correspond to a search processing portion shown in FIG. 4.

Data to be processed is data composed of a set of records each of which has a plurality of fields (attributes). Each record has a predetermined number of fields. In this case, it is assumed that only a particular record does not have a different number of fields from those of the other records. In addition, it is assumed that data contains at least one field of which a sequence is considered.

A field of which a sequence is considered is a field that has the relation of a sequence such as date and time or a field of which a sequence occurs when data are sorted such as a customer ID (identifier) field. Alternatively, in a plurality of fields, a sequence may be considered so that a date field and a time field compose one sequence field.

When such target data is searched for a pattern of which a sequence is considered, a general purpose processing system that designates a general purpose pattern with an event definition (intra-event definition) and an inter-event definition, interprets the designated pattern, and searches the target data for the interpreted pattern is used.

An event definition is a unique name assigned to a condition designated to at least one field. When a condition is designated to one field, for example "customers who bought a PC as a commodity are called 'customer group A'" can be defined. When conditions of a plurality of fields are designated, a combination of conditions of a plurality of fields for example "customers who bought a PC as a commodity at a price of ¥250,000 are named 'customer group A'" is treated as one literal.

In other words, an event is defined as a label of a record that satisfies a condition of at least one field. In addition, as with a wild card in a regular expression, a condition that matches anything can be designated.

FIG. 3A shows an example of an event defined as "customers who bought a PC as a commodity at a price of ¥250,000 are called 'customer group A'". As was described above, a combination of conditions of a plurality of fields cannot be represented in a regular expression of a character string.

An inter-event definition represents a relation between events using an event definition. In an inter-event definition, the case of which a plurality of events occur at the same time in the sequence and the case of which the intervals of the sequence of events are not constant (the sequence of events is represented at any intervals).

As a practical example, assuming that an event of which customers who bought a PC at a price of ¥250,000 are called 'A' and an event of which customers who bought a TV at a price of ¥100,000 are named 'B', an inter-event definition of which "the interval from 'A' to 'B' is within three days" can be considered. In other words, a definition of which "the interval from 'A' to 'B' is within three days (the difference between the date field of 'A' and the date field of 'B' is within three days)" can be performed.

In addition, other than a field of which a sequence is considered, a condition between events can be defined. For example, "the price at 'A' is larger than the price at 'B'" can be defined. In addition, even if an event definition is designated with a wild card that matches any pattern, a condition can be designated with an inter-event definition.

Figure 3B:
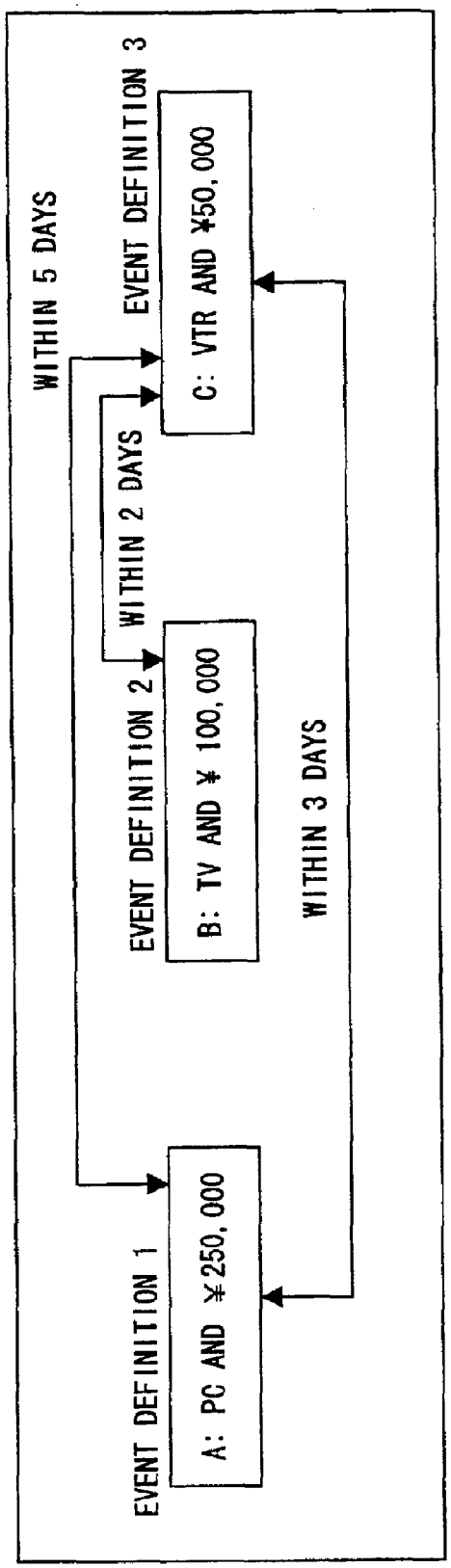
FIG. 3B is a schematic diagram showing an inter-event definition.

FIG. 3B shows an example of an inter-event definition. This example defines that the interval between the event 'A' and the event 'B' is within three days, that the interval between the event 'B' and the event 'C' is within two days, and that the interval between the event 'A' and the event 'C' is within five days.

In a regular expression, using '.' that matches any character, a . . . b represents that 'b' occurs after literal 'a' by three characters. Thus, that is different from an event definition of which a condition is designated in at least one field.

In addition, when the relation of any events is defined, a matching pattern as a search target can be represented in a graph structure. In the example shown in FIG. 3B, inter-event definitions occur between the event definition 1 and the event definition 2, between the event definition 2 and the event definition 3, and between event definition 1 and the event definition 3.

Since a sequence pattern handled according to the present invention can have such a graph structure and can be designated by a combination of event definitions and inter-event definitions, the sequence pattern is clearly different from a pattern in a regular expression. When event definitions and inter-event definitions are used, a search pattern that cannot be represented with a conventional regular expression can be designated.

The searching apparatus according to the embodiment generally designates a pattern based on a sequence prescribed by such event definitions and inter-event definitions, interprets the pattern, and executes the interpreted pattern. When a pattern based on a sequence is interpreted, one of two methods is used. In the first method, as with an interpreter, the pattern is dynamically interpreted. In the second method, as with a compiler, before the pattern is interpreted, it is substituted with instructions that can be executed by a computer.

FIG. 4 shows the basic structure of the searching apparatus according to the embodiment. The searching apparatus shown in FIG. 4 comprises data 111 as a search target, a search pattern 112 designated by event definitions and inter-event definitions, and a search processing portion 113 that interprets the search pattern 112 and executes a search. The search processing portion 113 outputs a searched result 114. Only by changing the definition of the search pattern 112, a variety of types of searches can be executed.

Figure 5:
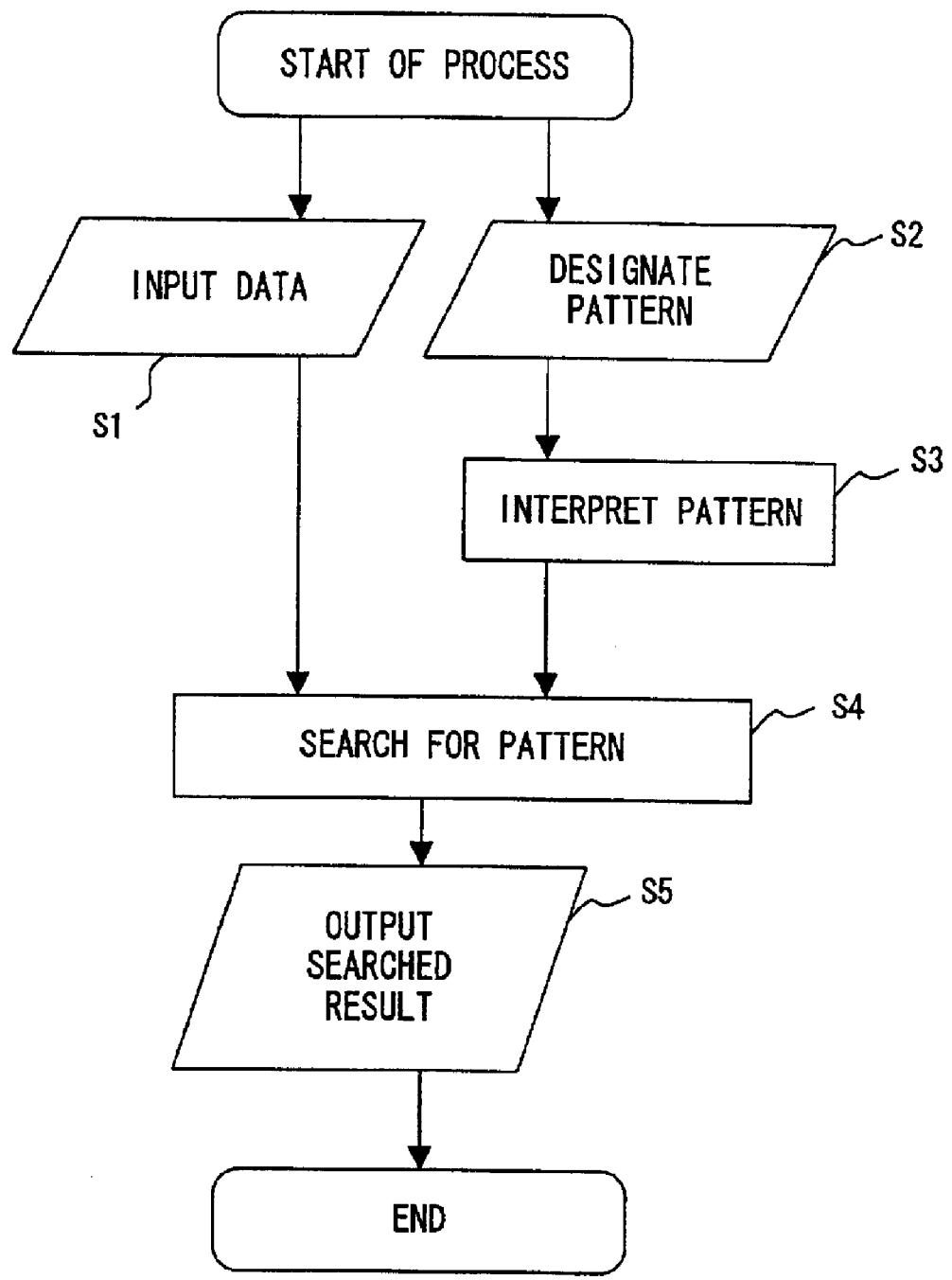
FIG. 5 is a flow chart showing an overall process.

FIG. 5 is a flow chart showing the overall process of the search processing portion 113. The search processing portion 113 inputs the data 111 (at step S1) and the search pattern 112 (at step S2), interprets the search pattern 112 (at step S3), searches for the designated pattern (at step S4), and outputs the searched result 114 (at step S5) Hereinafter, the search pattern 112 is called event pattern.

Figure 6:
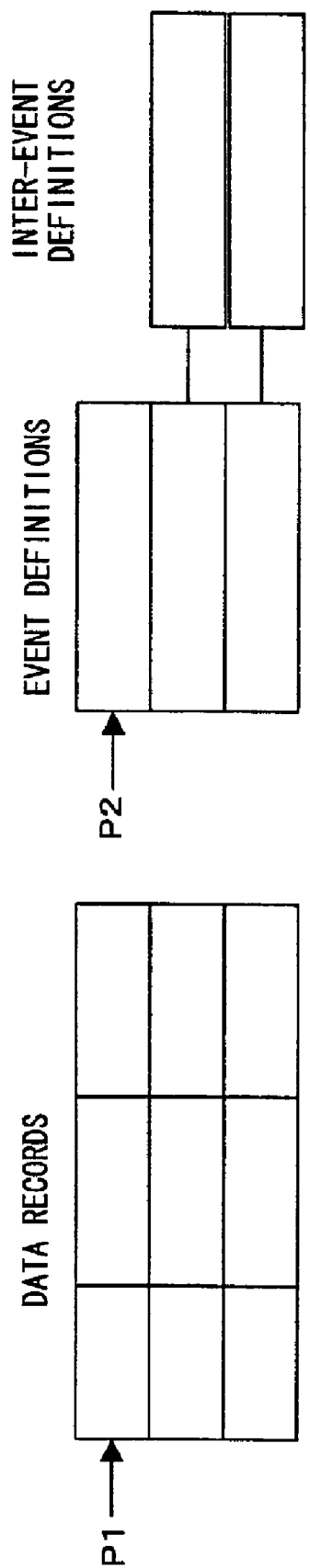
FIG. 6 is a schematic diagram showing the structure of data when a search is performed.

FIG. 6 shows the structure of data stored in the search processing portion 113 at step S4. The search processing portion 113 is provided with a pointer P1 that points to data and a pointer P2 that points to an event definition and an inter-event definition. Unlike with regular character string data, data that occur on the same day have the same sequence. Thus, data to which the pointer P1 points may be a plurality of records rather than one record.

Event definitions are described in the order of occurrences of events. An inter-event definition is described in a field of the last event contained therein.

FIG. 7 is a flow chart showing the searching process at step S4 shown in FIG. 5. First of all, the search processing portion 113 reads a data to which the pointer P1 points (at step S11) and determines whether or not the pointer P1 points to the last data (at step S12). When the pointer P1 does not point to the last data, the search processing portion 113 determines whether or not the data satisfies an event definition to which the pointer P2 points (at step S13). When the data does not satisfy the event definition, the search processing portion 113 increments the pointer P1 by 1 (at step S17). Thereafter, the flow returns to the step S11. The search processing portion 113 repeats the process from step S11.

When the data satisfies the event definition, the search processing portion 113 further determines whether or not the data satisfies an inter-event definition to which the pointer P2 points (at step S14). When the data does not satisfies the inter-event definition, the flow returns to step S17. The search processing portion 113 repeats the process from step S17.

When the data satisfies the event definition, the search processing portion 113 determines whether or not the pointer P2 points to the last data (at step S15). When the pointer P2 does not point to the last data, the search processing portion 113 increments the pointer P2 by 1 (at step S18). Thereafter, the flow returns to step S17. The search processing portion 113 repeats the process from step S17.

When the pointer P2 points to the last data, since the search processing portion 113 has found a combination of data that satisfy all the event definitions and inter-event definitions, the search processing portion 113 registers the data as a searched result (at step S16). Thereafter, the flow returns to step S17. The search processing portion 113 repeats the process from step S17.

When the pointer P1 points to the last data at step S12, since the search processing portion 113 has completed the searching process for all data, the search processing portion 113 outputs the registered searched result. At step S16, the search processing portion 113 may immediately output the searched result rather than registering it. It should be noted that the flow chart shown in FIG. 7 is just an example of the searching process. For the searching process, any pattern matching method can be used.

Next, with reference to FIGS. 8 to 21, additional functions of the searching apparatus will be described.

When the searching apparatus collects a plurality of input data (logs) recorded in many files, the searching apparatus can generate an input data as a search target composed of a plurality of attributes. For example, when the searching apparatus performs a join operation of a relational database or uses an external program, the searching apparatus generates data as a search target with a plurality of files (data).

When the searching apparatus generates data as a search target with a table shown in FIG. 8 and a table shown in FIG. 9, the searching apparatus applies an SQL statement as shown in FIG. 10 to the two tables and executes a joint operation therefor. As a result, data as shown in FIG. 1E are generated. In this case, although the two tables contain different fields, when they are jointed, a table that contains all the fields of the two tables is generated.

With respect to a set of records each of which is composed of a plurality of attributes, when each attribute is compressed by for example an integer-forming process, data as a search target can be generated. For example, customer IDs shown in FIG. 1E are converted into four-byte integers and then they are compressed to two-bit values as follows.

| Integer | 2 bits |
|---------|--------|
| "10001" | 00 |
| "10002" | 01 |
| "10003" | 10 |

With the compressed customer IDs, the data shown in FIG. 1E can be rewritten as shown in FIG. 11. When the compressed data can be restored to original character strings and then output, they can be internally processed as two-bit. Thus, since the memory space required for the process can be reduced, the searching process can be executed at high speed.

In addition, with respect to a set of records each of which is composed of a plurality of attributes as a search target, when records that are not necessary for a pattern to be found are not used, the required memory space can be reduced. As a result, the cost necessary for input and output can be reduced. In other words, records that are not necessary as a pattern to be found are excluded from the beginning of the searching process. For example, it is assumed that the following event pattern has been defined.

Event definitions
Event 1: commodity=milk
Event 2: commodity=bread
Inter-event definition
Event 1. date=event 2. date In the example, an event pattern of which milk and bread were bought on the same day has been designated. Thus, it is clear that data with respect to commodities other than milk and bread are not necessary. Thus, when data are read from a file, data with respect to the commodities other than milk and bread are not read to the memory.

Figure 12:
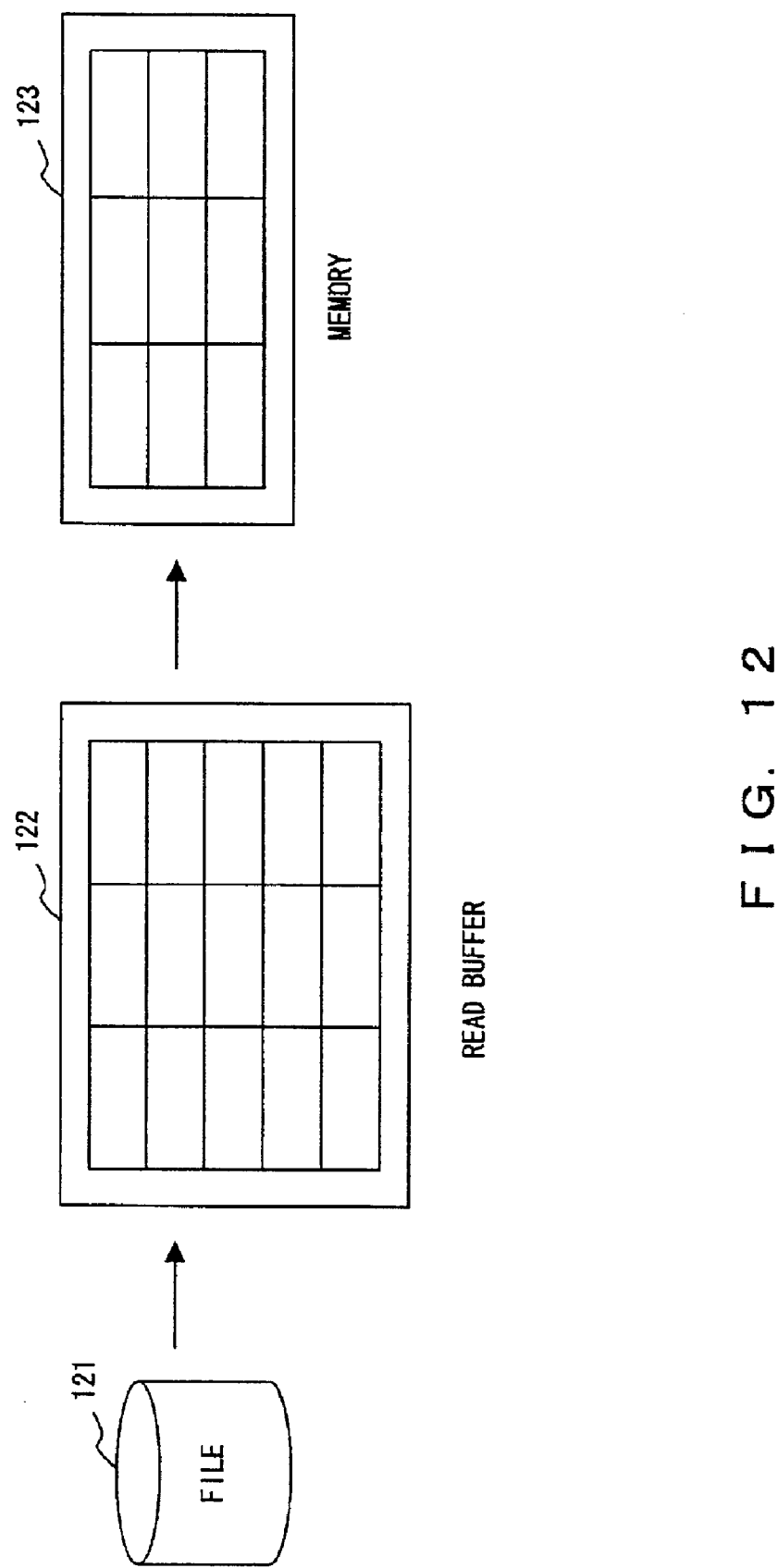
FIG. 12 is a schematic diagram showing a record deleting process.

FIG. 12 shows a process for deleting unnecessary records. Data recorded in a file 121 are temporarily input to a read buffer 122. In the read buffer 122, unnecessary data are deleted from the records that have been input. Only necessary records are written as search target data to a memory 123. In the memory 123, a searching process is performed. As a result, it can be expected that not only the memory space can be reduced, but the process can be executed at high speed.

In the case that data have a hierarchical structure of for example two classes such as a large class and a small class of commodities, when values are rewritten corresponding to the hierarchy, a process can be performed considering thereof. Next, an example of which values are rewritten corresponding to a hierarchy of commodities will be described.

| Large class | Large class code | Small class | Small class code | Large class code + small class code |
|---|---|---|---|---|
| Perishable | 10000 | Cucumber | 1 | 10001 |
| Perishable | 10000 | Chinese cabbage | 2 | 10002 |
| Fishery | 20000 | Horse mackerel | 1 | 20001 |
| Fishery | 20000 | Flat fish | 2 | 20002 |
| Meat | 30000 | Beef | 1 | 30001 |

In the example, a five-digit code (10000, 20000, . . . ) is assigned to the large class, whereas a four-digit code (0001 to 9999) is assigned to the small class. By adding a large class code and a small class code, a uniquely identifiable code is assigned to one of commodity. When values are rewritten in such a manner, classes can be easily distinguished with codes. Thus, a particular class can be designated as a search target.

For example, when 2000<=commodity code<=29999 is designated with an event definition, a class of fishery is designated. When both a large class and a small class are designated with an event definition (for example, commodity code=10002), a particular commodity can be designated.

Next, a method for designating a pattern matching in the searching process will be described. A pattern matching in a regular expression is normally performed by a "longest match" that returns the longest character string that matches a given character string pattern. However, in a Perl (Practical Extraction and Report Language) processing system, a "shortest match" that returns the shortest character string that matches a given character pattern can be designated.

In a pattern matching based on a sequence according to the embodiment, in addition to a matching designation in a regular expression, another matching designation can be performed. Next, with reference to search target data shown in FIG. 13, these matching designations will be described. For easy understanding, records shown in FIG. 13 are assigned unique record numbers each. In the example, it is assumed that as an event pattern, the following pattern is used.

Event definitions
Event 1: Commodity=milk
Event 2: Commodity=bread
Inter-event definition
Event 1. Date<Event 2. Date In this example, the condition "Event 1. Date<Event 2. Date" represents that the date of the event 1 is earlier than the date of the Event 2. In a "first match" that returns the first pattern that matches the given event pattern, records of record numbers 1 and 4 are extracted.

These records are a record of milk that occurred first and a record of bread that occurred later than the date of the record of milk and that occurred first in records of bread. In this case, the extracted pattern is denoted by (1, 4) as a combination of the record numbers.

Likewise, in a "shortest match" that returns the shortest pattern of patterns that match the given event pattern, record numbers (1, 4) are extracted. This is because with respect to the data shown in FIG. 13, in combinations of records that match the event pattern, the interval between the record 1 and the record 4 is the shortest.

By repeating the "shortest match" from the beginning of the data, a plurality of combinations of records that match the event pattern can be extracted. In this case, a portion that matches the event pattern in the first shortest match is removed. The shortest match is repeated for the rest of the data as a new search target.

Next, in a "longest match" that returns the longest pattern of patterns that match the given event pattern, record numbers (1, 7) are extracted. This is because with respect to the data shown in FIG. 13, the interval between the record 1 and the record 7 is the longest in combinations of records that match the given event pattern.

In addition, in an "all match" that returns all patterns that match the given event pattern, three combinations of record numbers (1, 4), (1, 7), and (3, 7) are extracted.

In addition to a forward matching that is performed from the beginning of data, a backward matching that is performed from the end of data can be designated. To explain such matching designations, the following event pattern of which the inter-event definition of the above-described event pattern is changed is used.

Event definitions
Event 1: Commodity=milk
Event 2: Commodity=bread
Inter-event definition
Event 1. Date>Event 2. Date In a "backward first match performed from end of data", the first pattern that backwardly matches the given event pattern is returned. In the data shown in FIG. 13, as the pattern returned, record numbers (6, 4) are extracted.

Next, in a "backward shortest match performed from end of data", a pattern that backwardly matches the given event pattern and whose interval is the shortest is returned. In the data shown in FIG. 13, record numbers (3, 2) are returned. Likewise, in a "backward longest match performed from end of data", a pattern that backwardly matches the given event pattern and whose interval is the longest is returned. In the data shown in FIG. 13, record numbers (6, 2) are returned.

In such a manner, when an event pattern is used, various matching designations can be performed. Thus, a designating method corresponding to an object can be used.

When the searching apparatus is provided with a graphic user interface (GUI), the user can designate a desired event pattern with the GUI. In this case, the user can designate two types of event definitions and inter-event definitions with the GUI.

Figure 14:
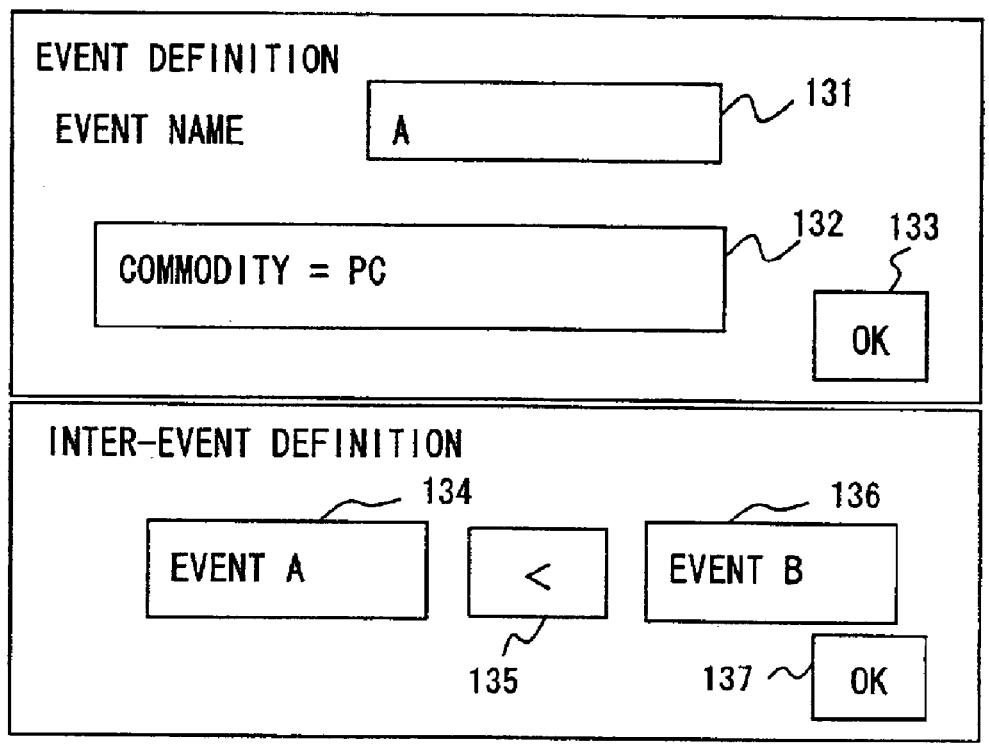
FIG. 14 is a schematic diagram showing a GUI screen.

FIG. 14 shows an example of such a GUI screen. An event name is input to an invent definition box 131. An event condition is input to a box 132. When the user clicks an OK button 133, the designation of the event definition is completed. In this case, an event of which a PC as a commodity is bought is defined as 'A'. Likewise, an event of which a TV as a commodity is bought is defined as 'B'.

In addition, defined event names are input to inter-event definition boxes 134 and 135. The relation between the events that are input to the boxes 134 and 136 is input. When the user clicks an OK button 137, the designation of the inter-event definition is completed. In this example, with respect to the relation between the event A and the event B, a condition of which the event B occurred after the event A is designated. Alternatively, a condition of which the interval between the two events is within predetermined days may be designated.

In addition, an event pattern can be designated by extending a regular expression. Although a regular expression does not support a simultaneous occurrence of a plurality of events and a description of an interval between events, when their descriptions are added, an event pattern of which a sequence is considered can be designated. When a simultaneous occurrence is denoted by for example '=', a simultaneous occurrence of an event A: "Commodity=PC, Price=¥100,000" and an event B: "Commodity=TV, Price=¥50,000" can be represented as follows.
    Event pattern:
    Event defintions
        Event A: Commodity=PC,
            Price=¥100,000
        Event B: Commodity=TV,
            Price=¥50,000
    Inter-event definition
        Event A. Date=Event B. Date
A pattern of which after the event A and the event B simultaneously occurred an event C: "commodity=VCR, Price=¥30,000" occurred can be represented as follows.
    Event pattern:
    Event defintions:
        Event A: Commodity=PC,
            Price=¥100,000
        Event B: Commodity=TV,
            Price=¥50,000
        Event C: Commodity=VCR,
            Price=¥30,000
    Inter-event definition
        Event A. Date=Event B. Date
            <Event C. Date
When a simultaneous occurrence and an interval are described, an event pattern that cannot be represented in a regular expression can be easily designated.

As mentioned above, when the search processing portion interprets a given event pattern, the process is performed by one of two methods (1) as with an interpreter, the pattern is dynamically interpreted and (2) as with a compiler, before the pattern is interpreted, it is substituted with instructions that can be executed by a computer. When the search processing portion has found a pattern that matches an event pattern from given data, the search processing portion outputs predetermined information corresponding to the found pattern. Next, the case of which the following query is input to the data shown in FIG. 1E will be described.
    Event pattern:
    Event defintions
        Event A: Commodity=milk
        Event B: Commodity=bread
    Inter-event definition
        Event A. Date=Event B. Date
Whenever the searching apparatus has found a pattern, if it outputs information of a group of records that compose the found pattern as it is, the searching apparatus outputs information of the following two records.

| 10001 | 03/21 | Milk  | 189 | (record corresponding to the event A) |
| 10001 | 03/21 | bread | 300 | (record corresponding to the event B) |

In addition, the user can designate an output format of a found pattern. In this case, information of a group of records that compose the found pattern is complied in a designated format and then output. For example, when the following output format is designated in the above-described query:
    Event A. Commodity, Event B.
    Commodity,
then the following searched result is output:
    Milk, Bread.
In addition, an operation using particular field values can be designated like:
    "Event B. Date—Event A. Date".
In this case, with respect to the designated field values of records contained in the found pattern, the result of the designated operation is output.

In addition, after all patterns have been found, an aggregate function can be executed for a group of records. The aggregate function includes conventional functions such as minimum value (MIN), maximum value (MAX), average (AVG), and sum (SUM) can be used. When an aggregate function is processed, whenever a pattern is found, it is stored in a buffer. After the process has been completed, the aggregate function is executed for all the stored patterns. For example, the user can designate an aggregate function of AVG (Event B. Date—Event A. Date) for the above-described query.

When a pattern that matches an event pattern is not found, it is necessary to inform the user thereof in any means. For example, a record that represents that there is no matched pattern may be prepared. With the record, a message may be displayed on a screen. In such a manner, the user can be informed of the message. When the following query is input for the data shown in FIG. 1E, there is no matched pattern.
    Event pattern:
    Event defintions:
        Event A: Commodity=Milk
        Event B: Commodity=Bread
    Inter-event definition
        Event A. Date<Event B. Date In the case that a set of records each of which is composed of a plurality of fields is given, when the records are grouped, the process can be executed at high speed. In this case, a field by which the records are grouped and a field by which a set of records of each group is sorted are designated. The records are pre-sorted by the designated fields. In this case, a plurality of fields in which a set of records are grouped may be designated.

For example, it is assumed that data shown in FIG. 15 as a search target are grouped by a customer ID field and then the records of each group are sorted by a date-of-purchase field. In this case, the data as a search target are grouped and sorted as shown in FIG. 16. A customer whose customer ID is 110001001 bought two commodities A and N on 2001/01/13 (Jan. 13, 2001) as his or her first time store shopping. In addition, the same customer bought a commodity B on 2001/01/28 (Jan. 28, 2001) as his or her second time store shopping. For the sorted data, an event pattern is designated.

As was described above, an event definition of an event pattern defines at least one field value. One name is assigned to all conditions of an event definition. On the other hand, an inter-event definition is a condition of a plurality of events.

Figure 17:
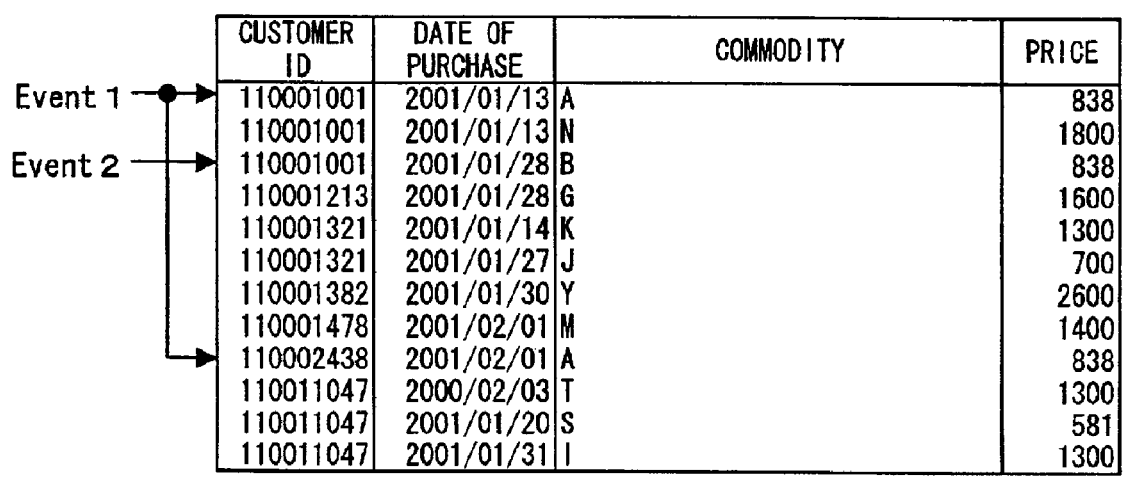
FIG. 17 is a schematic diagram showing data records corresponding to an event pattern.

In the case of the data shown in FIG. 16, as shown in FIG. 17, it is assumed that a record whose commodity field is 'A' is defined as Event 1 and that a record whose commodity field is 'B' is defined as Event 2. In addition, assuming that the interval between the date on which Event 1 occurred (date of purchase) and the date on which Event 2 occurred (date of purchase) is within 30 days and that the price of Event 1 is equal to the price of Event 2, an event pattern as shown in FIG. 18 is obtained.

In this example, since data have been grouped and sorted, the search processing portion can perform a matching by successively extracting the data. When all data that have not been grouped and sorted are not stored in a memory, since it is necessary to repeatedly read the data, the efficiency of the process deteriorates. Thus, it is clear that when data are grouped and sorted, they can be processed at high speed.

In the above-described example, data are grouped and sorted in each group. Alternatively, in the case that all data as a search target are treated as one group, when the data are successively sorted, they can be processed at high speed. FIG. 19 shows an example of which sales data of a particular store have been sorted in the order of dates (by the date field). When all the data are sorted in the order of dates, a process for searching m data records for n events can be simplified from an order O (mn) to an order O (m+n).

In addition, when indexes are used, without need to grouping and sorting data, the process can be performed at high speed similar to that in the case that they are grouped and sorted. In this method, a set of records are indexed on a group axis and on a sequence axis. As a result, records of each group can be accessed successively.

Figure 20:
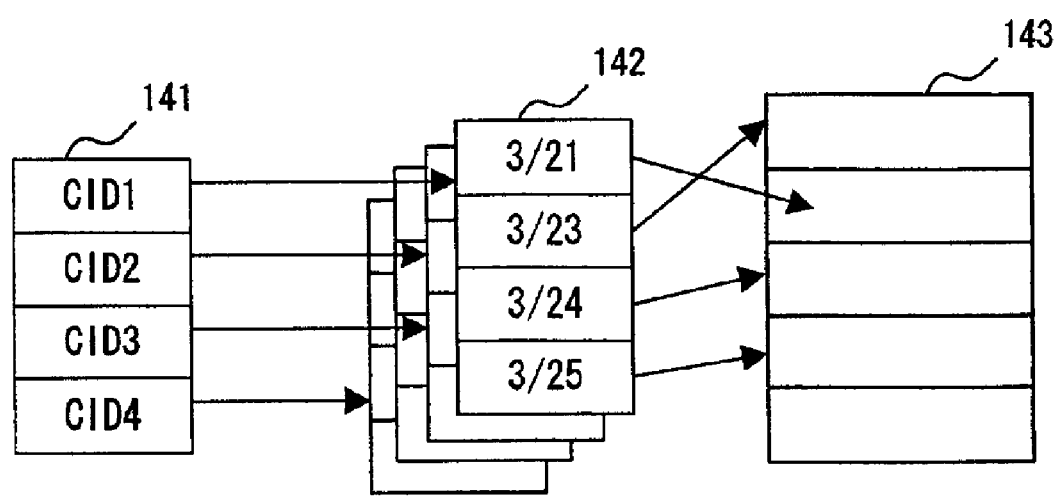
FIG. 20 is a schematic diagram showing a first index.

FIG. 20 shows that case that data that have been indexed are accessed. In the example, data 143 are accessed through a group information storing portion 141 and a plurality of indexes 142. The group information storing portion 141 has a plurality of customer identifiers (CID1 to CID4) corresponding to a plurality of groups and pointers that point to the indexes 142 corresponding to the individual customer identifiers. Each of the indexes 142 stores a plurality of pieces of date data and pointers that point to records corresponding thereto. With the group information storing portion 141 and the indexes 142, the search processing portion can access records of each group in the order of dates.

Figure 21:
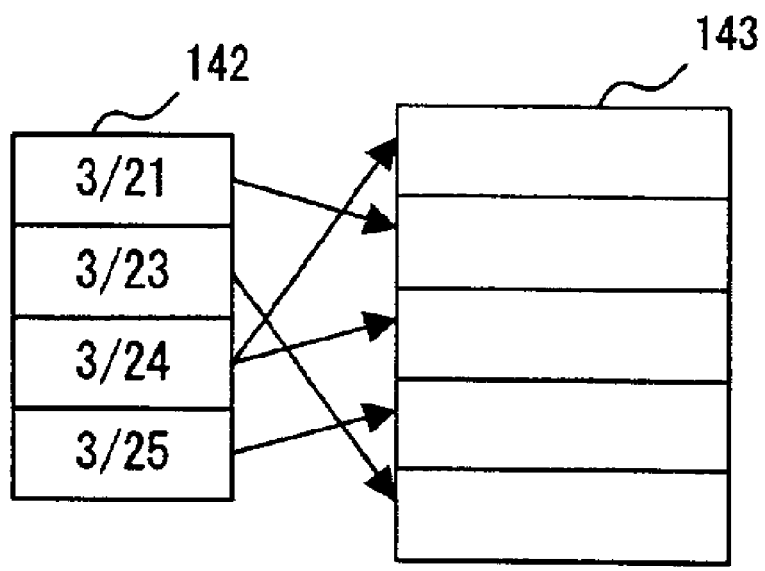
FIG. 21 is a schematic diagram showing a second index.

In addition, in the case that all data are treated as one group, when indexes are used, the process can be performed at high speed without need to sorting them. In this case, since the group information storing portion 141 shown in FIG. 20 can be omitted, a structure as shown in FIG. 21 can be used. With the indexes, the search processing portion can access records in the order of dates.

Next, with reference to FIGS. 22 to 27, examples 1, 2, and 3 of the searching process will be described.

FIG. 22 shows sales data as a search target. In FIG. 22, each record is composed of five fields that are RID (Record Identifier), customer ID, date of purchase, commodity, and price. It is assumed that data are grouped in the customer ID field and that the records of each group are sorted by the date-of-purchase field.

Because of the limited space, FIG. 22 shows only records of a group of which the customer ID is 110001001. In the following, a process for only this group will be mainly described. Actually, however, the similar process is performed for groups of other customer IDs.

EXAMPLE 1

Now, consider an event pattern that is designated as follows

Event pattern:
Event defintions
  Event 1: Commodity=A
  Event 2: Price<=838
Inter-event definition
  Event 2: Within three days after Event 1
    (Event 2. Date of purchase<=Event 1. Date of purchase+3 days)

When such a query is given, the search processing portion interprets the given query and internally generates a pattern structure (query pattern) as shown in FIG. 23. Although a pattern matching can be executed in various manners, the pointer P2 shown in FIG. 6 can be used. When the process is started, the pointer P2 is initialized so that it points to the beginning of the query pattern.

The pattern matching is performed for each group. The search processing portion successively extracts records from the beginning of each group and determines whether or not each of the extracted records matches each of pre-interpreted event definitions. When each record matches each of the event definitions, the search processing portion determines the matched record matches the pre-interpreted inter-event definition. When the record matches the inter-event definition, the search processing portion advances the pointer P2 by one.

In the query pattern shown in FIG. 23, the first record R1 shown in FIG. 22 matches the event definition of Event 1 to which the pointer P2 points. Thus, the search processing portion checks whether or not the record satisfies the condition of the inter-event definition. However, Event 1 is not defined in the inter-event definition. Thus, when the record R1 matches the event definition, the record R1 matches Event 1. Thus, as shown in FIG. 24, the search processing portion changes the pointer P2 so that it points to Event 2.

Thereafter, the search processing portion reads the record R2 and determines whether or not it satisfies the event definition "Price<=838" of Event 2. However, since the price of the record R2 is ¥1,800, it does not satisfy the event definition of Event 2. Thus, the search processing portion processes the next record R3. Since the price of the record R3 is ¥838, the record R3 satisfies the condition of the event definition of Event 2. Thus, the search processing portion checks whether or not the record R3 satisfies the inter-event definition of Event 2.

In this case, the inter-event definition represents the condition of which the date on which Event 2 (namely, the record R3) occurred is within three days after the date on which Event 1 occurred. Since the interval between the record R3 and the record R1 is 15 days, the record R3 does not satisfy the condition of the inter-event definition. In addition, since the records are sorted in the ascending order by the date-of-purchase field, it is clear that the interval between each of records after the record R3 and the record R1 that satisfies Event 1 is 15 days or longer. Thus, since there is no record that satisfies the inter-event definition of Event 2 at that point, the search processing portion terminates the process for the group.

In such a manner, the search processing portion performs the matching process for data of each group. When all the conditions of the query pattern are satisfied, the matching becomes successful. In the above-described example, in the group whose customer ID is 11001001, there is no pattern that matches the query pattern. As a result, the search processing portion outputs a result that represents "there is no designated pattern".

EXAMPLE 2

Next, consider an event pattern that is designated as follows. In this example, it is assumed that two matching methods that are first matching and all matching are designated.

Event pattern:
Event defintions
  Event 1: Commodity=A
  Event 2: Price<=838
Inter-event definition
  Event 2: Within 3 days after Event 1
  (Event 2. Sequence<=Event 1. Sequence+3)

The event definitions in this example are the same as those in the example 1. However, in the example 2, the inter-event definition has a condition of which the date on which Event 2 occurred is within three days after the date on which Event 1 occurred instead of the condition in the example 1. In this case, each record is assigned a unique sequence number starting from 1 in the order of the date-of-purchase field. The data as a search target shown in FIG. 22 are converted into internal format shown in FIG. 25.

In FIG. 25, the same sequence number 1 has been assigned to both the records R1 and R2. The sequence number represents the date on which the customer with the customer ID 110001001 came to the store first time. Likewise, the same sequence number 2 has been assigned to the records R3 and R4. The sequence number 2 represents the date on which the customer came to the store second time. Likewise, sequence numbers 3, 4, and 5 are assigned to the records R5, R6, and R7, respectively. They represent the dates on which the customer came to the store third, fourth, and fifth times, respectively. In this example, the sequence is a logical concept. Whether the sequence field shown in FIG. 25 is physically provided depends on the system installation.

When the search processing portion performs a searching process, it interprets a query in the same manner as the example 1 and internally generates a query pattern as shown in FIG. 26. First of all, as with the example 1, the first record R1 matches the event definition of Event 1. Thus, the search processing portion changes the P2 so that it points to Event 2.

Next, although the search processing portion reads the record R2, since the price of the record R2 is higher than ¥838, the search processing portion checks whether or not the next record R3 satisfies the event definition of Event 2. Since the price of the record R3 satisfies the event definition of Event 2, the search processing portion checks whether or not the record R3 satisfies the inter-event definition of Event 2.

In this example, the inter-event definition represents the condition of which the date on which Event 2 occurred is within three days after the date on which Event 1 occurred. In other words, the condition is in that the sequence number of Event 2 is 4 or less of which 3 is added to 1 as the sequence number of the record R1. Since the sequence number of the record R3 is 2 that is smaller than 4 and the date of the record R3 is the next date on which the customer came to the store after the date of the record R1, the record R3 satisfies the condition of the inter-event definition.

When the search processing portion has searched up to the record R3, since the pattern designation composed of Event 1 and Event 2 is satisfied, the search processing portion outputs a pattern (R1, R3) as a first matched pattern. Thereafter, the search processing portion checks whether or not the record R4 that is a record whose date on which the customer came to the store is the same as that of the record R3 satisfies the condition of Event 2 when Event 1 is the record R1. As a result, it is clear that the record R4 satisfies both the event definition and the inter-event definition of Event 2. Thus, the search processing portion outputs a pattern (R1, R4).

Since the two patterns (R1, R3) and (R1, R4) satisfy the query pattern with the same date on which the customer came to the store, it is uncertain which of these patterns is earlier than the other. Thus, when there are a plurality of data at the same position (date and time), unlike with conventional data in a regular expression, there may be a plurality of answers.

Since the date of the next record R5 is not the same as those of the records R3 and R4, when the first matching has been designated, the search processing portion terminates the process at the record R5. In contrast, when the all matching has been designated, the search processing portion continues the process for the record R5 and later records. As a result, in addition to the patterns (R1, R3) and (R1, R4), the search processing portion outputs a pattern (R1, R6) as a searched result. Since the price of the record R6 is ¥581 that is lower than ¥838 and the sequence number of the record R6 is 4, the interval of the pattern (R1, R6) is three days. Thus, the pattern (R1, R6) satisfies the given pattern designation.

Assuming that the searched result is represented as (Event 1.RID, Event 2.RID), when first match and all match have been designated, the search processing portion outputs the following patterns.

First match: (R1, R3), (R1, R4)
All match: (R1, R3), (R1, R4), (R1, R6)

EXAMPLE 3

Consider an event pattern that is designated as follows. It is assumed that two matching methods that are first match and all match are designated.

Event pattern:
Event defintions
  Event 1: Commodity=A
  Event 2: any (representing wild card)
Inter-event definitions
  Event 2: Within 3 days after Event 1 AND Price of
    Event 1 or lower (Event 2. Sequence number<=
Event 1. Sequence number+3 AND Event 2. Price<=
Event 1. Price)

The event definitions of the example 3 are different from those of the examples 1 and 2 in that Event 2 is a wild card that matches anything. In addition to the condition of which the interval between the date of Event 1 and the date of Event 2 is within three days as with the example 2, the inter-event definition defines a condition of which the price of Event 2 is equal to or lower than the price of Event 1. As with the example 2, each record is assigned a unique number starting from 1 as a sequence number in the order of the date-of-purchase field. The internal format shown in FIG. 25 is used as search target data.

As with the examples 1 and 2, when the search processing portion performs a searching process, it interprets the given query and internally generates a query pattern as shown in FIG. 27. The first record R1 matches the event definition of Event 1. The search processing portion changes the pointer P2 so that it points to Event 2.

Thereafter, the search processing portion reads the record R2. However, since the event definition of Event 2 is a wildcard, it matches anything. Thus, the search processing portion checks whether or not the record R2 satisfies the inter-event definition of Event 2. The inter-event definitions defines two conditions. The first condition is in that the date on which Event 2 occurred is within three days after the date on which Event 2 occurred. The second condition is with respect to price. Although the record R2 satisfies the first condition of which the date on which Event 1 occurred is within three days after the date on which Event 2 occurred, the record R2 does not satisfy the second condition because the price of the record R2 is higher than the price of the record R1.

Thereafter, the search processing portion reads the record R3. The record R3 unconditionally satisfies the event definition of Event 2. Thereafter, the search processing portion checks whether or not the record R3 satisfies the inter-event definition of Event 2. The sequence number of the record R3 is 2 that is smaller than 4. The date of the record R3 is the next date of the record R1. In addition, since the price of the record R3 is ¥838, it is lower than the price of Event 1. Thus, the record R3 satisfies both the two conditions of the inter-event definition.

When the search processing portion has searched up to the record R3, since the pattern designation composed of Event 1 and Event 2 is satisfied. Thus, the search processing portion outputs a pattern (R1, R3) as a first matched pattern. Thereafter, the search processing portion checks whether or not the record R4 satisfies the condition of Event 2. Since it is clear that the record R4 satisfies both the event definition and the inter-event definition of Event 2, the search processing portion outputs a pattern (R1, R4).

Since the date of the next record R5 is not the same as those of the records R3 and R4, when first match has been designated, the search processing portion terminates the process at the record R5. On the other hand, when all match has been designated, the search processing portion continues the process for the record R5 and the later records. As a result, in addition to the patterns (R1, R3) and (R1, R4), the search processing portion outputs a pattern (R1, R6) as a searched result. Since the sequence number of the record R6 is 4, in the pattern (R1, R6), the interval of dates on which the customer came to the store is three days. In addition, since the price of the record R6 is ¥581, it is lower than the price of the record R1 that is ¥838. Thus, the pattern (R1, R6) satisfies the given pattern designation. Consequently, when first match and all match have been designated, the search processing portion outputs the following patterns.

First match: (R1, R3), (R1, R4)
All match: (R1, R3), (R1, R4), (R1, R6)

For simplicity, in the above-described three examples, only two events that are Event 1 and Event 2 were used. In addition, each of the event definition and the inter-event definition defines only one or two conditions. However, actually, an event pattern can be designated with more events. In each of event definitions and inter-event definition, more conditions can be designated.

Figure 28:
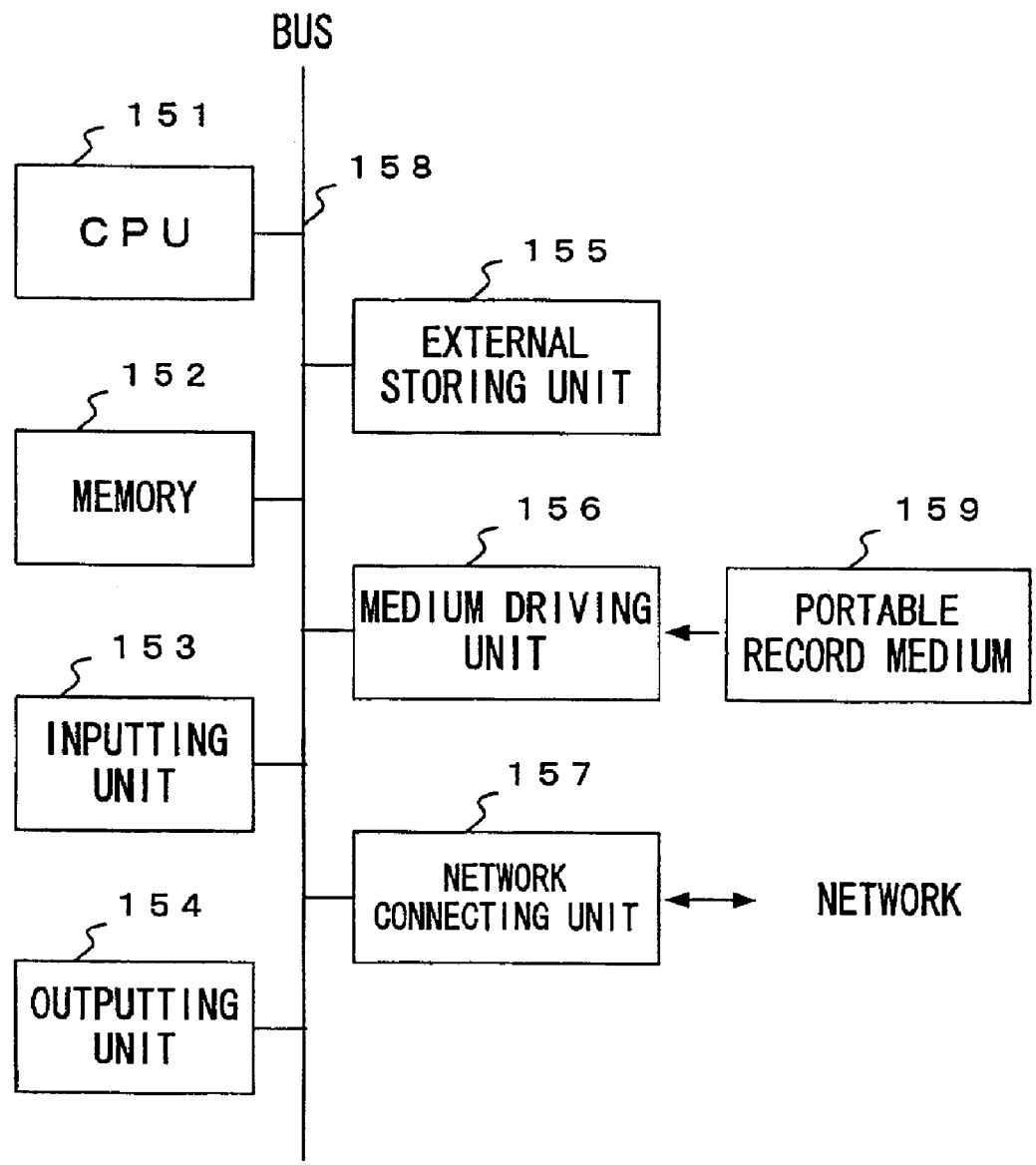
FIG. 28 is a schematic diagram showing the structure of an information processing apparatus.

The searching apparatus shown in FIG. 4 is composed of an information processing apparatus (computer) as shown in FIG. 28. The information processing apparatus shown in FIG. 28 comprises a CPU (Central Processing Unit) 151, a memory 152, an inputting unit 153, an outputting unit 154, an external storing unit 155, a medium driving unit 156, and a network connecting unit 157 that are connected to each other through a bus 158.

The memory 152 includes for example a ROM (Read Only Memory), a RAM (Random Access Memory), and so forth. The memory 152 stores a program and data used for a required process. The CPU 151 executes a program through the memory 152 so as to perform a required process. The search processing portion 113 shown in FIG. 4 corresponds to a program stored in the memory 152.

Examples of the inputting unit 153 are a keyboard, a pointing device, a touch panel, and so forth. The inputting unit 153 is used for the user to input a command and information. Examples of the outputting unit 154 are a display, a printer, a speaker, and so forth. The outputting unit 154 is used to output a query and a searched result to the user.

Examples of the external storing unit 155 are a magnetic disc unit, an optical disc unit, a magneto-optical disc unit, a tape unit, and so forth. The information processing apparatus stores the above-described program and data to the external storing unit 155. When necessary, the information processing apparatus loads the program and data to the memory 152 and uses them therethrough.

The medium driving unit 156 drives a portable record medium 159 and accesses the content stored thereon. The portable record medium 159 is any record medium that can be read by a computer. Examples of the portable record medium 159 are a memory card, a flexible disc, a CD-ROM (Compact Disk Read Only Memory), an optical disc, a magneto-optical disc, and so forth. The user stores the above-described program and data to the portable record medium 159. When necessary, the user loads the program and data to the memory 152 and uses them therethrough.

The network connecting unit 157 is connected to any communication network such as a LAN (Local Area Network), the Internet, or the like so as to exchange data to be communicated. The information processing apparatus receives the above-described program and data from another unit through the network connecting unit 157. When necessary, the information processing apparatus loads them to the memory 152 and uses them therethrough.

Figure 29:
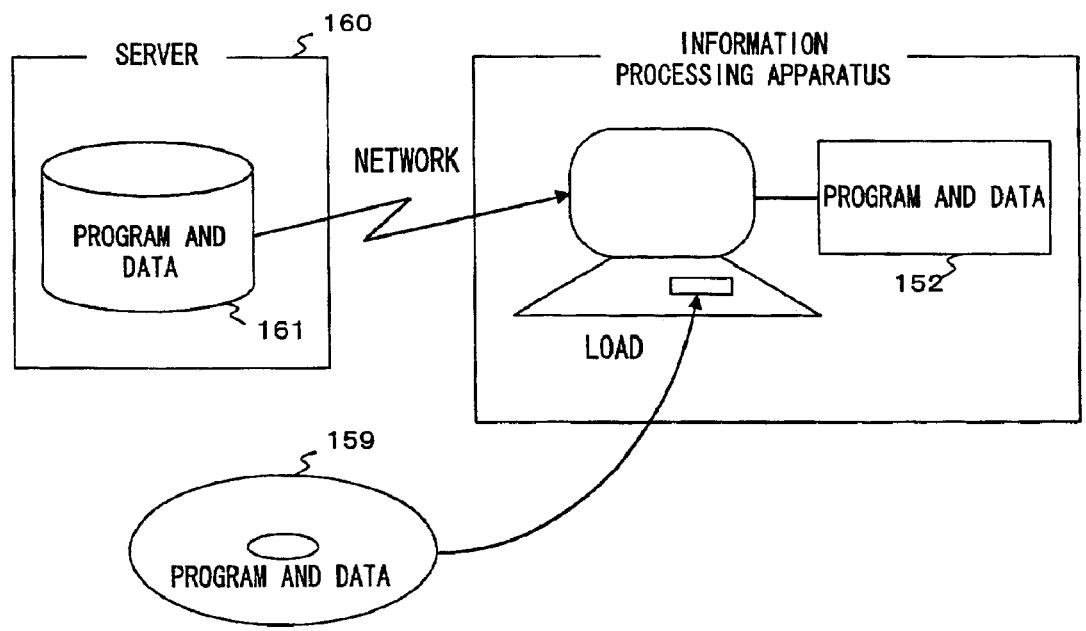
FIG. 29 is a schematic diagram showing a record medium.

FIG. 29 shows a computer readable record medium from which a program and data are supplied to the information processing apparatus shown in FIG. 28. The program and data stored on the portable record medium 159 or in a database 161 of a server 160 are loaded to the memory 152. At that point, the server 160 generates a carrier signal for transmitting the program and data and transmits the carrier signal to the information processing apparatus through any transmission medium on the network. The CPU 151 executes the program with the data and performs a required process.

According to the present invention, a pattern of which a sequence of data is considered can be easily designated and the designated pattern can be easily searched. In addition, according to the present invention, by changing a definition of a pattern, a variety of types of searches can be performed. Thus, the present invention is practically very useful.

What is claimed is:

1. A searching apparatus for searching a set of records for a combination of records, each of the records being composed of a plurality of attributes, the searching apparatus comprising:
   a designating device designating a search pattern using a plurality of events and a relation of a sequence of the plurality of events and designating a pattern matching method for matching the search pattern and the combination of records, including as possible pattern matching methods, an all match for returning all combinations of events that match the search pattern, a backward longest match for returning a combination of events whose interval is the longest in combinations of events that backwardly match the search pattern, and a backward shortest match for returning a combination of events whose interval is the shortest in combinations of events that backwardly matches the search pattern, each of the events defining a particular attribute of a record as a particular value, the relation of the sequence of the events being defined according to a sequential order of attribute values;
   a searching device searching the set of records for a combination of records corresponding to the designated search pattern; and
   an outputting device outputting a searched result.

2. The searching apparatus as set forth in claim 1, wherein the designating device designates a search pattern of which two or more events occurred at a same time in the sequence of the plurality of events.

3. The searching apparatus as set forth in claim 1, wherein the designating device designates a search pattern of which the relation of the sequence of the plurality of events is described at arbitrary intervals.

4. The searching apparatuses set forth in claim 1,
   further comprising a generating device collecting a set of records that contain a first attribute and a set of records that contain a second attribute and generating a set of records that contain both the first attribute and the second attribute,
   wherein the searching device searches the generated set of records.

5. The searching apparatus as set forth in claim 1,
   further comprising a compressing device compressing data of at least one of the plurality of attributes so as to compress the data of the set of records,
   wherein the searching device searches the compressed set of data.

6. The searching apparatus as set forth in claim 1,
   further comprising a deleting device deleting unnecessary records from the set of records according to the search pattern,
   wherein the searching device searches rest of the set of records.

7. The searching apparatus as set forth in claim 1,
   further comprising a rewriting device rewriting attribute values of an attribute of the plurality of attributes that have a hierarchical structure,
   wherein the searching device searches a set of records that have been rewritten.

8. The searching apparatus as set forth in claim 1, wherein the designating device includes a graphic user interface for defining the plurality of events and the relation of the sequence of the plurality of events.

9. The searching apparatus as set forth in claim 1, wherein the outputting device outputs information about the combination of records corresponding to the search pattern.

10. The searching apparatus as set forth in claim 1,
    wherein the designating device designates a format of the searched result, and
    wherein the outputting device compiles information about the combination of records corresponding to the search pattern in the designated format and outputs the result.

11. The searching apparatus as set forth in claim 1, wherein the outputting device performs an aggregate operation for the combination of records corresponding to the search pattern and outputs an operation result.

12. The searching apparatus as set forth in claim 1,
    wherein the designating device designates an attribute used for sorting records, and
    wherein the searching device sorts the set of records by values of the designated attribute and searches a set of records that have been sorted.

13. The searching apparatus as set forth in claim 12,
    wherein the designating device designates an attribute used for grouping records, and
    wherein the searching device groups the set of records by values of the designated attribute and sorts records of each group.

14. The searching apparatus as set forth in claim 1, further comprising an indexing device used for accessing the set of records according to the order of the attribute values.

15. The searching apparatus as set forth in claim 14, further comprising a group information storing device used for accessing the set of records for each group according to values of a predetermined attribute.

16. A searching apparatus for searching a set of records for a combination of records, each of the records being composed of a plurality of attributes, comprising:
    a designating device designating a search pattern using a plurality of events and a relation of a sequence of the plurality of events, each of the events defining a particular attribute of a record as a particular value, the relation of the sequence of the events being defined according to an order of attribute values, and designating as a pattern matching method for matching the search pattern and the combination of records, one of a longest match for returning a combination of events whose interval is the longest in combinations of events that match the search pattern, a shortest match for returning a combination of events whose interval is the shortest in combinations of events that match the search pattern, a match for repeating the shortest match, an all match for returning all combinations of events that match the search pattern, a backward longest match for returning a combination of events whose interval is the longest in combinations of events that backwardly match the search pattern, and a backward shortest match for returning a combination of events whose interval is the shortest in combinations of events that backwardly matches the search pattern;
    a searching device searching the set of records for a combination of records corresponding to the designated search pattern using a pattern matching by the designated method; and
    an outputting device outputting a searched result.

17. A computer-readable recording medium on which a program is stored, the program causing a computer for searching a set of records for a combination of records, each of the records being composed of a plurality of attributes, to perform:

designating a search pattern using a plurality of events and relation of a sequence of the plurality of events, each of the events defining a particular attribute of a record as a particular value, the relation of the sequence of the events being defined according to a sequential order of attribute values;

designating a pattern matching method for matching the search pattern and the combination of records, including as possible pattern matching methods, an all match for returning all combinations of events that match the search pattern, a backward longest match for returning a combination of events whose interval is the longest in combinations of events that backwardly match the search pattern, and a backward shortest match for returning a combination of events whose interval is the shortest in combinations of events that backwardly matches the search pattern;

searching the set of records for a combination of records corresponding to the designated search pattern; and outputting a searched result.

18. A searching method for searching a set of records for a combination of records, each of the records being composed of a plurality of attributes, the method comprising:

inputting into a computer a search pattern designated by using a plurality of events and relation of a sequence of the plurality of events, each of the events defining a particular attribute of a record as a particular value, the relation of the sequence of the events being defined according to a sequential order of attribute values; and searching the set of records for a combination of records corresponding to the designated search pattern, including as possible pattern matching methods, an all match for returning all combinations of events that match the search pattern, a backward longest match for returning a combination of events whose interval is the longest in combinations of events that backwardly match the search pattern, and a backward shortest match for returning a combination of events whose interval is the shortest in combinations of events that backwardly matches the search pattern.

19. A searching apparatus for searching a set of records for a combination of records, each of the records being composed of a plurality of attributes, the searching apparatus comprising:

designating means for designating a search pattern using a plurality of events and relation of a sequence of the plurality of events and for designating a pattern matching method for matching the search pattern and the combination of records, including as possible pattern matching methods, an all match for returning all combinations of events that match the search pattern, a backward longest match for returning a combination of events whose interval is the longest in combinations of events that backwardly match the search pattern, and a backward shortest match for returning a combination of events whose interval is the shortest in combinations of events that backwardly matches the search pattern, each of the events defining a particular attribute of a record as a particular value, the relation of the sequence of the events being defined according to a sequential order of attribute values;

searching means for searching the set of records for a combination of records corresponding to the designated search pattern; and outputting means for outputting a searched result.

* * * * *

UNITED STATES PATENT AND TRADEMARK OFFICE
CERTIFICATE OF CORRECTION

PATENT NO. : 6,990,487 B2 Page 1 of 1
APPLICATION NO. : 10/092444
DATED : January 24, 2006
INVENTOR(S) : Naokit Akaboshi et al.

It is certified that error appears in the above-identified patent and that said Letters Patent is hereby corrected as shown below:

Column 19 line 41 (claim 4), after "seraching" delete "apparatuses" and insert --apparatus as--.

Signed and Sealed this

Twenty-first Day of November, 2006

JON W. DUDAS
*Director of the United States Patent and Trademark Office*